United States Patent [19]

Berzaczy et al.

[11] Patent Number: 4,968,622
[45] Date of Patent: Nov. 6, 1990

[54] PROCEDURE FOR MICROBIOLOGICAL TRANSFORMATION OF SULPHUR CONTAINING HARMFUL COMPONENTS IN EXHAUST GASES

[75] Inventors: Ludwig Berzaczy, Vienna; Walter Etzenberger; Lothar Kloimstein, both of St. Pölten; Erwin Niedermayer; Alfred Schmidt, both of Vienna; Andreas Windsperger, Maria-Anzbach, all of Austria

[73] Assignees: Waagner-Biro Aktiengesellschaft; Glanzstoff Austria GesmbH, both of Austria

[21] Appl. No.: 258,489

[22] Filed: Oct. 17, 1988

[30] Foreign Application Priority Data

Oct. 19, 1987 [AT] Austria .................................. 2752/87

[51] Int. Cl.$^5$ ...................... B01D 53/00; B01D 53/36
[52] U.S. Cl. ..................................................... 435/266
[58] Field of Search ........................................ 435/266

[56] References Cited

U.S. PATENT DOCUMENTS

| | | | |
|---|---|---|---|
| 2,200,581 | 5/1940 | Pruss et al. | 435/266 |
| 4,662,900 | 5/1987 | Ottengraf | 435/266 |
| 4,760,027 | 7/1988 | Sablette | 435/266 |

*Primary Examiner*—Sam Rosen
*Attorney, Agent, or Firm*—Steinberg & Raskin

[57] ABSTRACT

A biological conversion process is provided for degradation of sulfur-containing pollutants such as $H_2S$, $CS_2$, COS, and also organic surfur compounds such as thio-alcohols, thio-ethers, and thiophenes in waste gas. A packed reactor is provided which has packing material covered with immobilized microorganisms of the family of Thiobacillaceae and which are continuously kept moist, so that metabolic products of the microorganisms are dissolved in the moisture and discharged continuously. A continuous concentration gradient for sulfate ions thereby results in the reactor or in the region of the microorganisms, these sulfate ions being neutralized in a second reactor by supplying lye (soda or potash lye) forming readily-soluble salts. These readily-soluble salts are transformed in a third reactor by addition of milk of lime into crystals (gypsum crystals) which are poorly-soluble in water and with formation of lye for the second reactor capable of being recirculated so that loss of chemicals (lye) is principally minimized. The poorly-soluble crystals from the third reactor can be discarded or utilized. The low sulfate supernatant is then conveyed to the main canal, through a biological clarification plant.

15 Claims, 1 Drawing Sheet

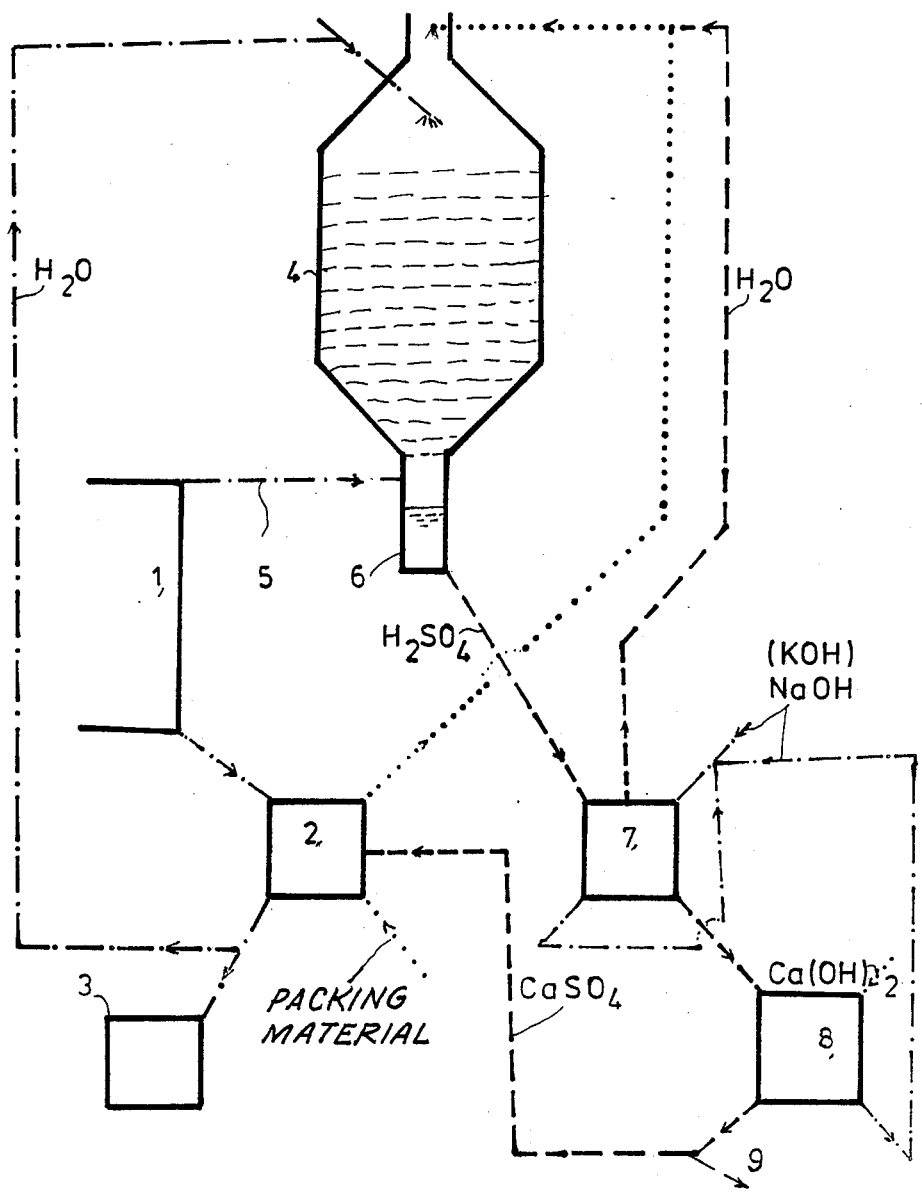

PROCEDURE FOR MICROBIOLOGICAL TRANSFORMATION OF SULPHUR CONTAINING HARMFUL COMPONENTS IN EXHAUST GASES

BACKGROUND OF THE INVENTION

The present invention relates to a process for microbiological conversion of sulfur-containing pollutants in waste gases, preferably $H_2S$, $CS_2$ and/or COS, in addition to thio-alcohols, thio-ethers, and thiophenes, into dilute acids and the elimination thereof, especially from waste gases from cellulose fiber manufacture.

Disposal of air mixed with the above-noted pollutants as combustion air in steam generators, or use thereof as aeration medium in waste water clarification plants, are known. However, since the respective oxygen requirement constitutes a quantity-limiting criterion and, as in most cases, the unpurified air or waste gas to be disposed of occurs in much larger quantities, complete disposal of these malodorant waste gases of relatively low noxious gas concentration had been an unsolved problem.

Adsorption methods for the separation of $H_2S$ and $CS_2$ from viscose waste gases, are also known. Thus, $H_2S$ can be adsorbed on coarse-pored, activated carbon impregnated with KI, while $CS_2$ may be adsorbed on a fine-pored, activated carbon. The regeneration of the S-laden, activated carbon is accomplished with liquid $CS_2$; $H_2SO_4$ is washed out with water; and $CS_2$ is desorbed with water vapor. In another method, carbon low in heavy metals is used for the oxidation of $H_2S$. $H_2SO_4$ formation in small amounts, is neutralized with $NH_3$.

Both methods can perform the processing steps of $H_2S$-oxidation and $CS_2$-adsorption in one adsorber or, for higher concentrations, in two separate adsorbers.

Combination processes are also in use which involve alkali scrubbing for removal of $H_2S$ and activated carbon adsorption for removal of $CS_2$.

However, these last-noted methods are unsuitable for the purification of large waste gas streams having low noxious gas concentration.

SUMMARY OF THE INVENTION

Accordingly, it is an object of the present invention to improve over the above-noted prior art methods, and eliminate the disadvantages thereof.

It is also an object of the present invention to render the initially-noted noxious gas components harmless, even when present in low concentrations in waste gases.

It is another object of the present invention to provide resulting compounds from the treatment of such noxious gaseous components which are either marketable or usable, or to at least neutralize or inactivate such resulting compounds to a great extent.

These and other objects are attained by the present invention which is directed to a process for microbiological conversion of sulfur-containing pollutants in waste gases and the elimination thereof, which comprises the steps of passing the waste gas through a packed reactor,
keeping packing within the packed reactor moist at all times and covering the packing with immobilized microorganisms of the family Thiobacillaceae,
neutralizing liquid dripping from the packing and which contains the pollutant which is thereby transformed into salt,
eliminating part of the thus-transformed salt from a system including the reactor,
replenishing liquid loss with clean water, and
allowing the remainder of the liquid with the dissolved salt to remain in the system.

The pollutant so treated includes at least one of $H_2S$, $CS_2$, COS, thio-alcohol, thio-ether, thiophene, with the waste gas resulting from synthetic fiber manufacture. The pollutant is converted to dilute acid by contacting the moist packing covered by the microorganisms in the reactor. The microorganisms are preferably Thiobacillus thiooxidans, with the sulfur compounds of the pollutant being oxidized by the microorganisms.

Thus, the present invention is characterized by the waste gas being conducted through a packed reactor, the packing of which is kept moist at all times and is covered with immobilized microorganisms of the family Thiobacillaceae, preferably Thiobacillus thiooxidans, and the liquid dripping from the packing and containing the pollutants, preferably acid sulfur compounds, which have been oxidized by the microorganisms being neutralized. The thus-oxidized pollutants are transformed into salts which are eliminated in part, and the volume loss is replenished by clean water, while the remainder of the liquid with the dissolved salts remains in the system.

Different variations within the scope of the present invention are further described below. For example, the waste gas may be conducted in counter-current to the liquid wetting the packing material, such liquid consisting essentially of recirculated, salt-containing, in particular sulfate ion-containing liquid, and to which fresh water or purified waste water mixed with trace elements is added, so that the ion increase existing between inflowing and outflowing liquid is eliminated from the system. The liquid flowing out of the reactor is neutralized in a decanting tank, by addition of NaOH or KOH, and the ion excess is discharged.

By addition of $Ca(OH)_2$, sulfate ions are removed from the discharged solution, and the resulting Ca salts are eliminated, while the resulting lye-containing solution, in particular NaOH and/or KOH-containing solution, is recirculated into the decanting tank, with the solubility limits being maintained in the reactor zone thereof. The temperature in the overall process of the present invention is preferably maintained at about 15° to 30° C., preferably from about 20° to 25° C. The sulfur bacteria are preferably formed in a biological waste water purification plant, and are immobilized on commercial by available packing material before being used in the reactor.

BRIEF DESCRIPTION OF THE DRAWINGS

The present invention will be explained in further detail below, with reference to embodiments thereof illustrated in the accompanying drawing, which is a schematic diagram of the overall process of the present invention herein.

DESCRIPTION OF THE PREFERRED EMBODIMENTS

In manufacture of staple fiber, cellophane, cellulose gut or endless yarn, a waste gas of about 50,000 to 700,000 $m^3$ per ton of product occurs which contains, depending upon the processing stage, different concentrations of $H_2S$, $CS_2$ and/or COS (rich gas stream, lean gas stream). Rich gases can generally be made use of for economical recovery of sulfur components. Lean gases constitute, in any event, odor problems and contain preferably up to 3,000 ppm $CS_2$, 1,000 ppm $H_2S$ and/or COS.

A part of this waste gas is purified in an experimental reactor of a diameter of 30 cm and a useful volume of 115 liters. This reactor is filled with packing covered with bacteria which originate from the sludge of the clarification plant and are essentially bacteria of the family Thiobacillaceae. After an adaptation time of about one week, these bacteria were immobilized on packing material. The waste gas to be purified traverses the reactor from the bottom up, with water being pumped in counter-current thereto on the order of about 20 to 100 liters per hour to remove the metabolic products formed. This water is cycled, the pH being adjusted to a value of about 3 to 10 in continuous operation before entrance into the reactor.

During passage through the column, the pH decreases by about 1 to 5 units, in the examples described further below. For removal of the metabolic products formed, about 1 liter of liquid per hour is eliminated from the circulation and replaced with fresh water. Any sulfur that is formed can be precipitated out of the eliminated stream with lime water, with partial recovery of the alkaline solution used for neutralization. To satisfy the requirements of the organisms for trace elements and inorganic substances such as phosphorus and nitrogen, an appropriate nutrient solution or salts of trace elements are mixed into the fresh water as used for breeding Thiobacillaceae.

The conversion of the sulfur-containing components by the bacteria occurs according to the following equations:

$$H_2S + 2\ O_2 > H_2SO_4$$

$$CS_2 + 4\ O_2 + 2H_2O > 2H_2SO_4 + CO_2$$

$$COS + 2\ O_2 + H_2O > H_2SO_4 + CO_2$$

The separation of $H_2S$ and $CS_2$ is presented as a function of the gas quantity conveyed through, in the following tables:

| Gas stream $m^3/h$ | Conc. crude gas Vppm | Conc. pure gas Vppm | Separation % |
|---|---|---|---|
| (1) Separation of $H_2S$ | | | |
| 10 | 20 | not demonstrable | 100 |
| 15 | 20 | not demonstrable | 100 |
| 20 | 20 | traces | 100 |
| 30 | 20 | 1 | 95 |
| 40 | 20 | 4 | 80 |
| (2) Separation of $CS_2$ | | | |
| 10 | 80 | not demonstrable | 100 |
| 15 | 90 | 7 | 92 |
| 20 | 90 | 8 | 91 |
| 30 | 80 | 19 | 78 |
| 40 | 80 | 42 | 42 |

The metabolic products draining from the reactor are neutralized by addition of lye (soda or potash solution), so that essentially soluble salts form, which are cycled. To prevent salt concentration in the cycle liquid, in conjunction with the ion increase in the reactor a corresponding quantity of salt solution is drawn from the neutralization vessel and this liquid quantity is replaced with fresh water. Since soda and/or potash solution is relatively expensive, a portion thereof can be recovered by addition of lime water, in accordance, e.g., with the following equation:

$$Na_2SO_4 + Ca(OH)_2 > 2NaOH + CaSO_4$$

The $CaSO_4$ precipitates or can be concentrated, while the supernatant is relatively low in sulfur and in this sense can be discharged via the biological clarification plant or returned for internal circulation. A processing diagram is illustrated in the accompanying figure.

In a chemical factory 1 for the production of staple fibre, cellophane, cellulose gut or endless yarn, a sulfur-containing waste water occurs in addition to the waste gas, the waste water being purified biologically in a clarification plant 2. Unless used for internal cycles, the pure water is discharged into a main canal 3. In the biological clarification plant, sulfur bacteria form which are immobilized on commercial packing material. This packing material is charged into a reactor 4 and maintained continuously moist therein, for which the nutrient-rich, clean water with sulfur bacteria from the clarification plant 2 is naturally especially suitable.

The waste gas occuring in the factory 1 is introduced by conduit 5 to the wetting liquid of the packing bodies in counter current to the liquid introduction and passes through the packed bed, with the bacteria binding the sulfur-containing parts of the waste gas and forming sulfuric acid as metabolic product which is dissolved by the dripping liquid and collects in a sump 6 of the reactor 4.

This acid-containing solution is mixed in an additional reactor 7 with lye, in particular with soda or potash solution, so that a salt forms which is supplied to a third reactor 8 in which the soluble salts are transformed by addition of milk of lime into substantially insoluble crystals which, eliminated from the process, can be stored in a dump 9 or utilized.

The supernatant, low in sulfur, can be released via the biological clarification system into the main canal 3. The liquid occuring in the reactor 8 is principally dissolved soda or potash solution and is returned to the reactor 7 to avoid loss of chemicals. Separation of the two reactors 7 and 8 principally serves the purpose of achieving a concentration of the solution and also a separation of the bacteriological cycle from the gypsum cycle, so that crystal formation in reactor 7 is deliberately precluded.

The preceding description of the present invention is merely exemplary, and is not intended to limit the scope thereof in any way.

I claim:

1. Process for the microbiological conversion and removal of sulfur-containing pollutants from waste gas containing the same, comprising the steps of
    passing said waste gas containing sulfur-containing pollutants through a packed reactor packed with microorganisms of the family Thiobacillaceae immobilized on packing material,
    passing liquid through said packing material so as to maintain the same in moist condition,
    said microorganisms converting said sulfur-containing pollutants to sulfuric acid which with said liquid drips from the packing, neutralizing the acidic dripping liquid with alkali to form corresponding salt which is dissolved in said liquid, reacting the thus obtained solution with $Ca(OH)_2$, thus converting the dissolved salt to the corresponding insoluble salt and obtaining an alkali-containing solution, removing the insoluble salt, and recycling the remaining alkali-containing solution for neutralization of additional acidic dripping liquid.

2. Method according to claim 1, wherein liquid loss is replenished with clean water.

3. Method according to claim 2, wherein remaining liquid containing dissolved salt therein remains in the system.

4. The method of claim 1, wherein the pollutant includes at least one of $H_2S$, $CS_2$, COS, thio-alcohols, thio-ether or thiophene, with the waste gas resulting from cellulose fiber manufacture.

5. The method of claim 4, comprising the additional step of converting the pollutant to dilute acid by contacting the same with the moist packing covered by the microorganisms in the reactor.

6. The method of claim 5, wherein the microorganisms are Thiobacillus thiooxidans.

7. The method of claim 1, comprising the additional steps of recirculating at least some of the salt-containing liquid remainder back to the reactor, conducting the waste gas and the liquid wetting the packing in counter-current to one another, and adding fresh water or purified waste water mixed with trace elements to the liquid, whereby ion increase existing between inflowing and outflowing liquid is eliminated from the system.

8. The method of claim 7, wherein the recirculated liquid consist essentially of sulfate ion-containing liquid.

9. The method of claim 1, wherein the liquid flowing out of the reactor is neutralized in a decanting tank by adding NaOH or KOH and discharging ion increase.

10. The method of claim 9, comprising the additional steps of adding $Ca(OH)_2$ to discharged solution out from the decanting tank, whereby $CaSO_4$ is formed and sulfate ions are removed from the discharged solution, eliminating the resulting insoluble $CaSO_4$, resulting in a lye-containing solution, recirculating the lye-containing solution into the decanting tank, and maintaining solubility limits within a reaction zone of the tank.

11. The method of claim 10, wherein the lye-containing solution comprises at least one of the NaOH and KOH.

12. The method of claim 11, comprising the additional step of maintaining temperature of the system at about 15° to 30° C.

13. The method of claim 12, wherein the temperature is maintained at about 20° to 25° C.

14. The method of claim 1, comprising the additional step of immobilizing the bacteria, which is sulfur bacteria formed in a biological waste water purification plant, on the packing before being introduced into the reactor.

15. The method of claim 1, comprising the additional step of adjusting pH of the replenishing liquid between about 3 and 10.

* * * * *